United States Patent [19]

Matsumoto et al.

[11] Patent Number: 5,759,464
[45] Date of Patent: Jun. 2, 1998

[54] METHODS FOR MANUFACTURING MULTILAYER MOLDINGS

[75] Inventors: Masahito Matsumoto; Nobuhiro Usui, both of Osaka; Satoru Gotoh, Chiba, all of Japan

[73] Assignee: Sumitomo Chemical Company, Limited, Osaka, Japan

[21] Appl. No.: 574,967

[22] Filed: Dec. 19, 1995

[30] Foreign Application Priority Data

Dec. 22, 1994 [JP] Japan .................. 6-319671

[51] Int. Cl.$^6$ .................. B29C 45/14; B29C 45/16
[52] U.S. Cl. .................. 264/138; 264/139; 264/257; 264/258; 264/263; 264/266; 264/278; 264/46.4; 425/112
[58] Field of Search .................. 264/275, 278, 264/266, 257, 258, 263, 46.4, 138, 139; 425/112

[56] References Cited

U.S. PATENT DOCUMENTS 2,197,465  4/1940  Brunetti .................. 264/275
4,833,741  5/1989  Mizuno et al.
5,509,990  4/1996  Masui et al. .................. 264/266

OTHER PUBLICATIONS

English Abstract of JP-B-04-26289.
English Abstract of JP-A-02-206513.

*Primary Examiner*—Jan H. Silbaugh
*Assistant Examiner*—Edmund H. Lee
*Attorney, Agent, or Firm*—Cushman Darby & Cushman IP Group of Pillsbury Madison & Sutro, LLP

[57] ABSTRACT

Methods for manufacturing multilayer moldings using a mold including a pair of male and female mold pieces for manufacturing a multilayer molding in which a part of its thermoplastic resin substrate surface is partially laminated with a shin material. Either the male or the female mold piece has a mold surface provided with a molten resin feeding path opening inside an area where the skin material is placed and at least one dent into which a part of or the whole skin material fringing end can be inserted, at a part of or the whole position corresponding to a fringe of the skin material to be laminated and a block to be fitted into the dent. The block is fitted into the dent so that the skin material fringing end inserted into the dent is sandwiched and fixed between an inner wall of the dent and the block and at the same time an upper surface of the block can form an even mold surface with the mold surface surrounding the dent.

9 Claims, 5 Drawing Sheets

METHODS FOR MANUFACTURING MULTILAYER MOLDINGS

BACKGROUND OF THE INVENTION

1. Field of the Invention

The present invention relates to a mold for manufacturing a multilayer molding and methods for manufacturing a multilayer molding.

2. Description of the Related Art

Multilayer moldings, partially laminated with a skin material covering a thermoplastic resin substrate, have been extensively used for automobile interior parts such as door trims, rear trims and instrument panels, as well as for consumer electronics.

The multilayer molding partially laminated with the skin material is generally manufactured by a compression molding method in which the skin material is placed in a specified position on a mold surface. Molten thermoplastic resin is then fed into the mold and the mold is pressurized and clamped until the cavity clearance achieves the final product thickness. Hereinafter, "thermoplastic resin" will be used interchangeably with "resin".

However, in such a method, it is difficult to accurately hold the skin material in the specified position on the mold surface. As a result of this placement difficulty, the skin material is displaced in the molding process by the feed pressure of the molten resin as well as by the flow of the molten resin in the molds at the time of clamping and the skin material will not be laminated in the specified position.

In an attempt to overcome these placement problems, Japanese Examined Patent Publication No. Hei 4-26289 proposed a method comprising steps of using a mold having bulkheads on a mold surface corresponding to the peripheral part of the skin material; allowing a fringing end of the skin material to lie along the bulkheads; locating the skin material inside an area surrounded by the bulkheads in a manner such that the skin material contacts the mold surface; optionally arresting the skin material fringing end on top of the bulkheads to fix the skin material if the top is sawtooth-like; and feeding molten resin.

In this method, the skin material is located inside the area surrounded by the bulkheads. However, because the skin material is not particularly fixed to the mold surface or because the arresting force is not sufficient even if the skin material fringing end is arrested at the sawtooth-like top of the bulkheads, the skin material moves over the bulkheads. The skin material moves over the bulkheads due to the feed pressure of the molten resin or the flow of the molten resin in the molds at the time of clamping. Therefore, it is difficult to accurately prevent displacement of the skin material with this method. Consequently, there is a problem with this method in that the skin material is limited to a thick fiber material which is less susceptible to the feed pressure of the molten resin or to the flow of the molten resin in the mold during mold clamping, or in that it is necessary to preform the skin material so that it may fit into the bulkheads.

Another method for the manufacture of a multilayer molding partially laminated with skin material is known where a multilayer molding having a part of the substrate surface laminated with a first skin material and the remaining part of the substrate surface laminated with a second skin material. Japanese Non-examined Patent Publication No. Hei 2-206513 discloses this method for the manufacture of a multilayer molding comprising the steps of inserting the fringing end of a first skin material into a circumferential groove provided on a mold surface; laying a second skin material on the overall surface of the mold surface while covering the first skin material with the second skin material; feeding a molten resin into a clearance between the skin material and the mold surface; and then cutting off a part of the second skin material overlapping the first skin material.

However, even in this process, because the first skin material fringing end is simply inserted into the circumferential groove, the first skin material is moved due to the feed pressure of the molten resin or the flow of the molten resin in the mold at the time of mold clamping. Therefore, it is difficult to accurately laminate the first skin material on the specified position of the substrate surface with this method.

SUMMARY OF THE INVENTION

The present inventors have investigated a method for easily manufacturing a multilayer molding having a part of the substrate surface partially laminated with at least one skin material, such as a multilayer molding which has a part of the substrate surface laminated with a skin material and the remaining part of the substrate surface allowed to constitute the molding surface as it is and a multicolored multilayer molding which has a part of the substrate surface partially laminated with the first skin material and the remaining part of the substrate surface laminated with the second skin material, without causing any displacement of the (first) skin material.

The present inventors have successfully developed a mold suitable for fixing the fringing end of the skin material partially placed on the mold surface. In addition, they have found that it is possible to manufacture a multilayer molding with the skin material accurately laminated on a specified position without causing any displacement of the skin material during the process of manufacturing the multilayer molding by using this mold. Thus, the present inventors have accomplished the present invention.

The present invention provides a mold comprising a pair of male and female mold pieces for manufacturing a multilayer molding in which a part of its substrate surface is partially laminated with the skin material, wherein either the male or the female mold piece has a mold surface provided with a molten resin feeding path opening inside the area where the skin material is placed and at least one dent, into which a part of or the whole skin material fringing end can be inserted, at a part of or the whole position corresponding to the fringe of the skin material and a block to be fitted into the dent so that the skin material fringing end inserted into the dent is sandwiched and fixed between an inner wall of the dent and the block and at the same time an upper surface of the block can form an even mold surface with the mold surface surrounding the dent.

The present invention also provides a method for manufacturing a multilayer molding partially laminated with skin material on the substrate surface using the above-mentioned mold, comprising the following steps of:

cutting the skin material into a specified shape;
placing the skin material cut into a specified shape on a specified position of the mold surface;
inserting a skin material fringing end into a dent provided on the mold surface;
fitting a block into the dent;
fixing the skin material to the mold surface;
feeding molten resin from at least a molten resin feeding path opening inside an area of the mold surface where the skin material is placed;

pressurizing and clamping the mold until a specified cavity clearance is achieved;

cooling the mold; and removing the multilayer molding from the mold.

The present invention also provides a method for manufacturing a multilayer molding with a first skin material partially laminated on a substrate surface and a second skin material laminated on the remaining substrate surface, comprising the following steps of:

cutting a first kin material into a specified shape;

placing the first skin material cut into a specified shape on a specified position of a mold surface;

inserting a first skin material fringing end into a dent provided on the mold surface;

fitting a block into the dent;

fixing the first skin material to the mold surface;

placing a second skin material over the whole mold surface while covering the first skin material;

feeding molten resin from at least a molten resin feeding path opening inside an area of the mold surface where the first skin material is placed;

pressurizing and clamping the mold until a specified cavity clearance is achieved;

cooling the mold;

removing the molding from the mold; and cutting off a part of the second skin material overlapping the first skin material from the removed molding along the fringe of the first skin material.

DETAILED DESCRIPTION OF THE INVENTION

The present invention will be illustrated in further detail with reference to the accompanying drawings.

Figure 1:
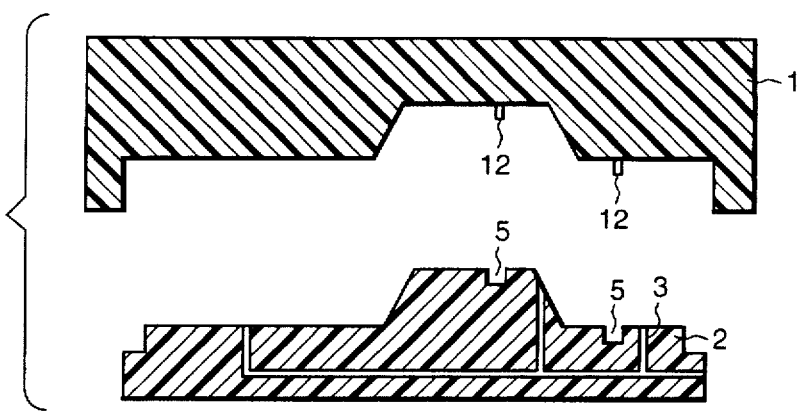
FIG. 1 is a schematic sectional view of the mold surface of the present invention.
Figure 2:
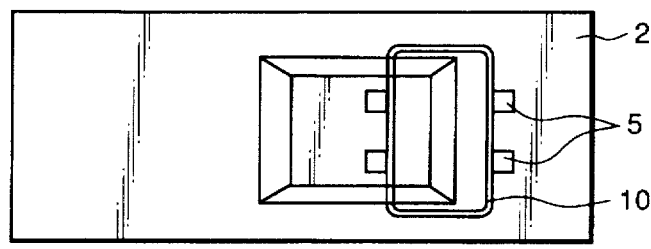
FIG. 2 is a plan view of the mold surface shown in FIG. 1.
Figure 3:
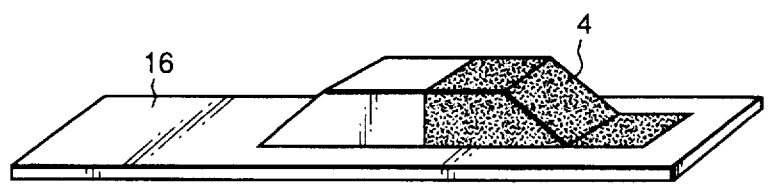
FIG. 3 shows an example of a multilayer molding manufactured by the method of the present invention using a perspective diagram.

FIG. 1 schematically shows an example of the mold according to the present invention for manufacturing a multilayer molding partially laminated with a skin material (4) on the surface of the resin substrate (16) as illustrated in FIG. 3. FIG. 2 is a plan view of the mold surface of the male mold piece (2) of the mold.

The mold contains a pair of female (1) and male (2) mold pieces, and in this example, the male mold surface has a molten resin feeding path (3) opening both inside the area where the skin material is placed and outside this area, and plural dents (5) at the position corresponding to the fringe of the skin material (4) to be laminated. In this preferred example, a continuous small groove (10) is provided on the male mold surface along the skin material fringe, and on the female mold surface a continuous band-shaped protrusion (12) is provided at the position corresponding to the small groove (10) situated on the male mold surface. The blocks to be fitted into the dents are not shown in these figures.

Figure 4A:
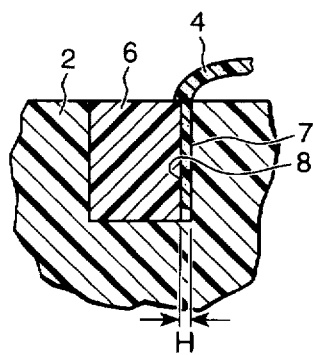
FIG. 4 shows a state in which the skin material fringing end is sandwiched and fixed between the block and the inner wall of the dent according to the present invention.
Figure 4B:
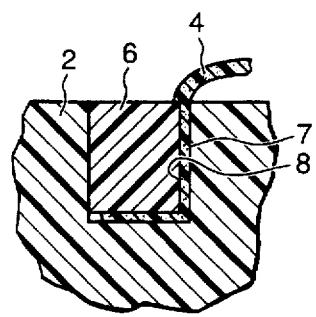
Figure 4C:
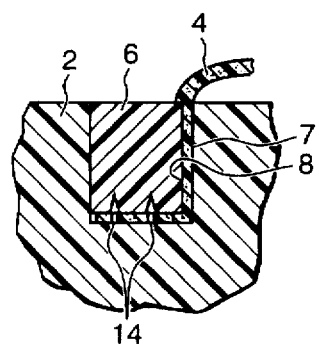

The dent (5) must be provided outside the area where the skin material is placed with one side of its opening being in contact with the skin material fringe as shown in the schematic cross sectional diagram of FIG. 4.

There is no particular limitation to the shape of the dent (5). The shape of the opening of the dent may be rectangular, triangular, semicircular, oval and so on, and in general, is rectangular. The side wall of the dent is generally nearly perpendicular to the mold surface adjacent to it, and may be a flat or curved plane expanding from the bottom to the opening. The bottom surface of the dent is generally flat, but may be curved. The shape of the dent is not particularly limited so long as the dent can fit the block (6) having a shape corresponding to the dent and is able to sandwich and fix the skin material fringing end with the block.

The number of the dents (5) is determined according to the size and properties of the skin material to be used, the location of the area where the skin material is placed, etc. In general, two or more dents are provided noncontinuously at optional intervals. However, if the area where the skin material is placed is not located on the center of the mold surface but only on the edge of the mold surface and contacts at a part of its periphery with the area where the skin materials is not placed, only one dent (5) may be provided at any optional position of the mold surface along the skin material fringe. In the above case, or even when the skin material is placed on the center of the mold surface, if the thermal fusibility of the molten resin and the skin material to be used is excellent, one continuous dent may be provided on the mold surface along the whole fringe part of the skin material.

The width of the opening of the dent (5) (the length in the outward direction from the skin material fringe) may be determined according to various conditions such as kind, thickness, and properties of the skin material to be used, size of the area where the skin material is placed, size of the mold surface, etc. The width is not particularly limited so long as it is within the range that the dent (5) can fit the block (6) and can fix the skin material fringing end with the block, and in general, is about 5–70 mm. There is no particular problem even when the width of the opening exceeds 70 mm, but there is no practical benefit. No particular limitation is provided for the depth of the dent (5) (this being the depth at the deepest position when the depth is not uniform) as long as the skin material can be fixed by fitting the block (6) into the dent (5). In general, the depth of the dent is more than one third of the thickness of the final molding, and a depth greater than molding thickness may be acceptable.

The length of the opening of the dent (5) (the length along the skin material fringe) is closely related to the number of the dents, the length of the fringe of the skin material to be used, the shape of the area where the skin material is placed, etc., in addition to various conditions for the width of the opening, except when the dent is provided along the whole fringe of the skin material. The length of the opening of the dent (5) is optionally determined to be in the range so that the dent (5) can fit the block (6) and can fix the skin material fringing end with the block. In general, the length is made comparatively long when the number of the dents is smaller or the length of the skin material fringe is long, while the length is made comparatively short when the number of the dents is large or the length of the skin material fringe is short. Regardless of the length of the skin material fringe, if the shape of the skin material to be used increases complexity, any proper embodiment can be taken, for example, the length of the opening of the dent is shortened and the number of the dents is increased.

When a plurality of such dents is provided, each dent is not necessarily identical. The width, length or depth of the opening of each dent may be varied according to the shape of the skin material to be used or the location of the area where the skin material is placed. The intervals between them are not necessarily equal, but may be optionally chosen in accord with various conditions such as the number of dents, length of the opening of the dent, length of the skin material fringe and the profile of the area of the mold surface where the skin materials is placed so that the skin material fringing end can be fixed.

The skin material fringing end is fixed between the inner wall (7) of the dent and the block. In general and as shown in FIG. 4-(1), the skin material fringing end is fixed between the inner wall (7) of the dent located at the skin material fringe side and the side surface (8) of the block located at the skin material fringe side. Therefore, the block (6) is basically designed to correspond to the space of the dent and to achieve the size that a proper clearance is allowed to exist between the inner wall (7) located at the skin material fringe side and the side surface (8) located at the skin material fringe side when the block is fitted into the dent (5).

The clearance (represented by "H" in the FIG. 4(1)) is at least smaller than the thickness of the skin material at a time when the skin material is not pressed, and varies in accord with the kind, thickness, properties, etc. of the skin material. Furthermore, the clearance must be determined in a manner such that the skin material fringing end can be securely fixed without moving when the molten resin is fed or the mold is clamped. It is generally within the range of 0.1 to 0.9 times as much as the thickness of the skin material at a time when the skin material is not pressed.

In order that the skin material fringing end is more securely fixed, the fringing end is deeply inserted onto the bottom wall of the dent (5) so as to be sandwiched between not only the side wall of the dent and the side surface of the block (6) but also the bottom wall of the dent and the lower surface of the block as shown in FIG. 4-(2). In order that the skin material fringing end is further more securely fixed, one or more pins or sawtooth-like skin material fixing protrusions (14) may be provided downwards on the lower surface of the block or upwards on the bottom wall of the dent, as shown in FIG. 4-(3). The skin material fringing end is pierced with the pins or is hooked on the tip end of the protrusion. In this event, it is also possible to shorten the height of the block in view of the height of the pin or the protrusion, or there may be provided clearances that can accept the pin or protrusion on the lower surface of the block or on the bottom wall of the dent opposing to the pin or the protrusion. In either case, if the skin material fringing end is deeply inserted onto the bottom wall of the dent, it is necessary to adjust the height of the block in accord with the thickness of the skin material so that an even surface is formed by the upper surface of the block (6) and the mold surface surrounding the dent (5) into which the block is fitted.

Figure 5A:
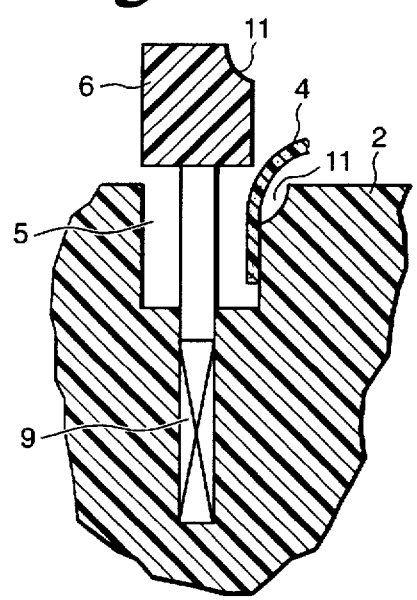
FIG. 5 shows a state in which the block is fitted and detached by using a sliding shaft.
Figure 5B:
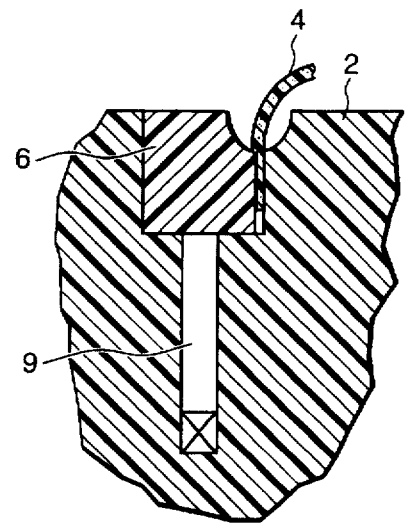

Either mold piece included in the mold of the present invention basically contains the mold surface with the dent (5) and the block (6), and the block is fitted into the dent to fix the skin material to the mold surface. In order to ensure that the block is securely fitted into the dent or the float-up of the block is reliably prevented during the molding process, the lower surface of the block may be integrally linked to the sliding shaft (9) that passes through the bottom wall of the dent and can slide in the mold-opening/closing direction. The block can be mechanically fitted and detached with the dent by operating the sliding shaft (9) as shown in FIG. 5. In this event, the sliding shaft is slid up to lift the block (6), the skin material fringing end is inserted into the dent (5) as shown in FIG. 5-(1) and then the sliding shaft is slid down to fit the block into the dent to fix the skin material fringing end as shown in FIG. 5(2). Each sliding shaft (9) may be operated individually, or may be operated in proper groups or all simultaneously. The sliding shafts (9) can be easily operated by utilizing, for example, hydraulic equipment.

Figure 6:
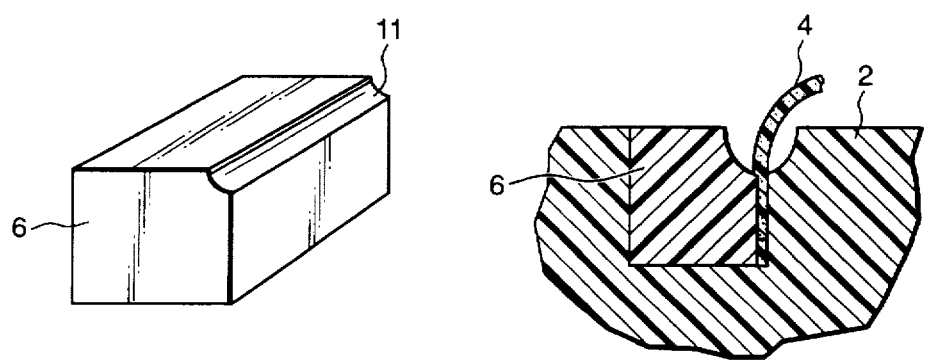
FIG. 6 shows the block with a notch and a state in which the skin material fringing end is sandwiched and fixed between the block and the inner wall of the dent with a notch.

In order to clarify the boundary between the skin material laminated part and the skin material nonlaminated part of the multilayer molding surface and to improve the appearance of the multilayer molding, a small groove (10) for inserting the skin material fringing end is provided on the mold surface along the fringe of the skin material. The small groove (10) is generally made so that the skin material fringe is located nearly at the center of the groove section or slightly towards the area where the skin material is placed when the skin material is placed onto the specified position. Such small groove (10) generally has a semicircular or U-letter cross-sectional shape but it may be rectangular or triangular or in the form of a parabola which opens upwards. The width and depth of the small groove (10) vary in accord with the kind of the skin material to be used and thickness of the multilayer molding to be produced. The width generally is less than about 10 times the thickness of the skin material, preferably is less than about 5 times, and the depth is less than about 10 times the thickness of the skin material, preferably is less than about 5 times at the deepest part. The upper edge of the dent (5) and the upper edge of the block (6) may respectively have notches (11) so that the small groove (10) exists continuously on the mold surface along the skin material fringe even when the block is fitted into the dent. The notches (11) form a small groove as shown in FIGS. 5 and 6.

Figure 7:
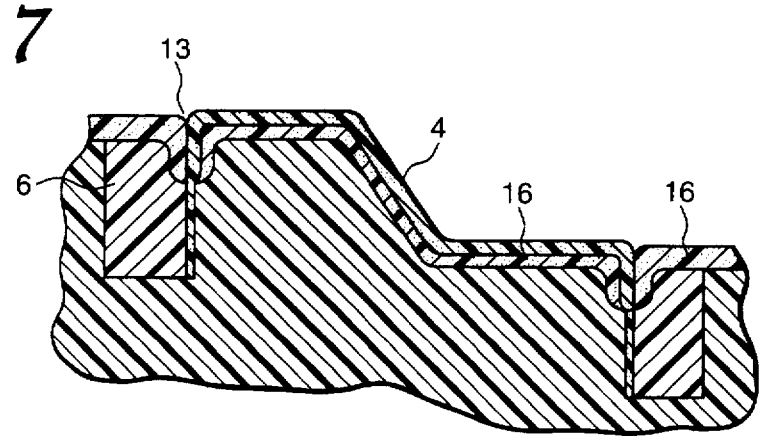
FIG. 7 shows a state in the mold at the position between the dents at a time after completion of the molding of a multilayer molding according to the present invention.
Figure 8:
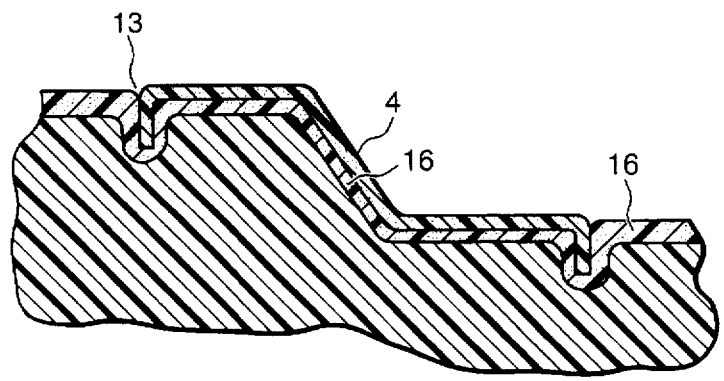
FIG. 8 shows a state in the mold between the small grooves after completion of the molding of the multilayer moldings in the method according to the present invention.

When a small groove (10) is provided on the mold surface, a continuous protrusion (12) corresponding to the small groove may be provided on another mold surface. When the protrusion contacts with and presses the skin material fringe at the time of molding, a groove (13) is formed on the multilayer molding corresponding to the protrusion (12). The boundary between the skin material laminated part and the skin material unlaminated part of the surface of the multilayer molding is further clarified as shown in FIGS. 7 and 8. The width of such protrusion (12) is optionally determined according to the desired width of the groove (13) to be formed on the multilayer molding. In general, the width of the protrusion is smaller than the width of the small groove (10) provided on the opposing mold surface. The height of the protrusion (12) varies in accordance with the thickness of the multilayer molding to be produced and the depth of the groove (13) to be formed. It is generally determined to be less than the sum of the thickness of the multilayer molding to be produced and the depth of the groove (13) to be formed.

Figure 9:
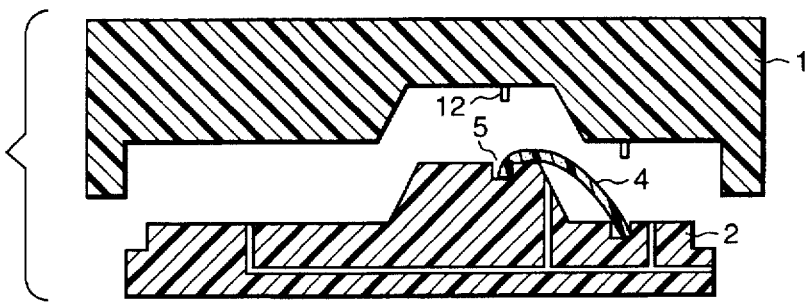
FIG. 9 is a schematic sectional view of the mold during the manufacturing process according to the present invention.
Figure 10:
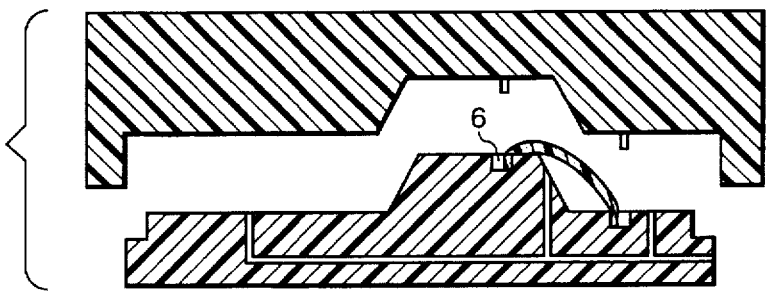
FIG. 10 is a schematic sectional view of the mold during the manufacturing process according to the present invention.
Figure 11:
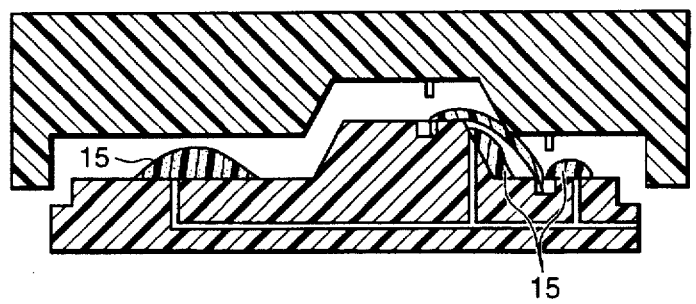
FIG. 11 is a schematic sectional view of the mold during the manufacturing process according to the present invention.
Figure 12:
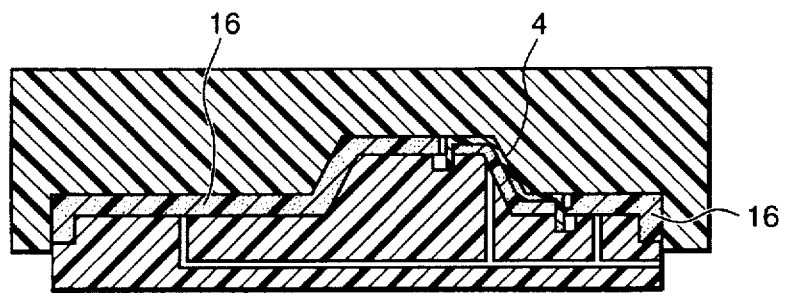
FIG. 12 is a schematic sectional view of the mold during the manufacturing process according to the present invention.

A method for successfully manufacturing a multilayer molding partially laminated with the skin material on the surface of the resin substrate comprising using the above mold of the present invention, for example, comprises the following steps:

the first step: cutting the skin material into a specified shape, placing the skin material cut into a specified shape on a specified position of the mold surface and inserting the skin material fringing end into the dent (5) and optionally the small groove (10) provided on the mold surface (FIG. 9);

the second step: fitting the block (6) into the dent and fixing the skin material to the mold surface (FIG. 10);

the third step: feeding molten resin from at least the molten resin feeding path opening inside the area of the mold surface where the skin material is placed (FIG. 11); and the fourth step: pressurizing and clamping the mold until a specified cavity clearance is achieved, and then cooling the mold and removing the molding from the mold (FIG. 12).

Figure 13:
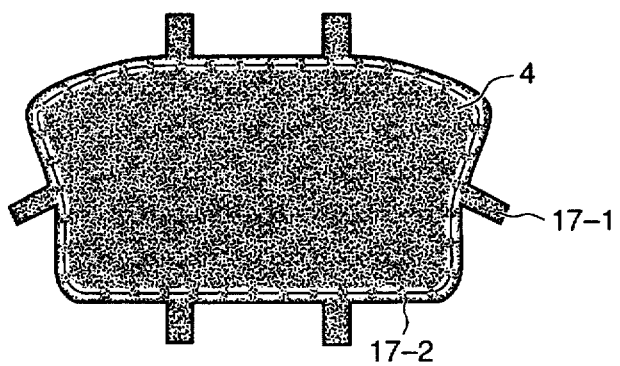
FIG. 13 shows an example of a cut skin material to be applied to the present invention.

In the first part of the first step, the skin material is cut according to the shape of the part of the molding where the skin material is to be laminated. At the time of cutting the skin material, it is necessary to cut with an insertion allowance (17-1) in order to be able to insert the skin material fringing end into the dent (5). It is preferred to provide the insertion allowance (17-1) in a manner such that its position corresponds to the position of the dent (5) when the skin material is placed on the specified position of the mold surface. It is also preferred that the width of the insertion allowance (17-1) be nearly equal to the dent opening length and its length be nearly equal to the length of the skin material fringing end to be inserted into the dent as shown in FIG. 13. When a small groove (10) is provided on the mold surface along the fringe of the skin material, the skin material must be cut with an insertion allowance (17-2) corresponding to the small groove (10) in order to insert the skin material into the small groove to its deepest part or along its inner wall to prevent the skin material from jumping out from the small groove. In such a case, the insertion allowance (17-1) to be inserted into the small groove and the insertion allowance (17-2) to be inserted into the dent (5) constitute the skin material fringing end. In the second part of the first step, the cut skin material is placed on the specified position of the mold surface and its fringing end is inserted into the dent (5) and the small groove (10) optionally provided.

In the second step, the block (6) is fitted into the dent (5) and the inserted skin material fringing end is sandwiched and fixed between the inner wall (7) of the dent and the block (6). If the block is provided integral with the mold via the sliding shaft (9), it is fitted into the dent by operating the sliding shaft.

In the third step where molten resin (15) is fed between mold pieces, the molten resin must be fed from at least the molten resin feeding path opening inside the area of the mold surface where the skin material is placed. When the molten resin is fed from the molten resin feeding path opening inside the area where the skin material is placed, an excess of molten resin fed between said skin material and the mold surface passes through under the skin material fringe at the position where the skin material fringing end is not fixed, that is, at a position other than the dents (5), and flows to an area where the skin material is not placed. As a result, a multilayer molding partially laminated with the skin material can be obtained. On the other hand, when the molten resin is fed from only the molten resin feeding path opening outside the area where the skin material is placed, the molten resin fed cannot flow into the clearance between the skin material and the mold surface under semi-scaled condition and a desired multilayer molding is not able to be obtained. Consequently, the molten resin must be fed from the molten resin feeding path opening inside the area where the skin material is placed. When the molten resin is fed from plural molten resin feeding paths, it must be fed from at least the molten resin feeding path opening inside the area where the skin material is placed. It is not preferred to feed the molten resin only from the molten resin feeding path opening outside the area where the skin material is placed.

When the dent (5) is provided on the mold surface along the whole fringe of the skin material, even if the molten resin is fed only from the molten resin feeding path opening inside the area where the skin material is placed, the molten resin cannot flow into the area where the skin material is not placed since all the skin material fringe is fixed. In such event, the molten resin must be fed from the molten resin feeding path opening outside the area where the skin material is placed in addition to from that opening inside this area.

When the molten resin is fed only from the molten resin feeding path opening inside the area where the skin material is placed, the whole volume of the molten resin necessary for the resin substrate must be fed from the feeding path. When the molten resin is fed from both the molten resin feeding path opening inside the area where the skin material is placed and from a feeding path opening which opens outside this area, the amount of molten resin to be fed from the former feeding path must, at least, be enough to form the substrate of the skin material laminated part of the final product. If it is less than that, a desired multilayer molding is not able to be obtained.

After the molten resin is fed, in the fourth step, both male and female mold pieces are clamped to enable the cavity clearance to achieve the final product thickness. Thereafter, the mold is cooled to remove the formed multilayer molding from the mold. This mold clamping is, in general, carried out after the feed of the molten resin has been completed. However, depending on the type of the skin material and resin as well as the shape of the mold, the mold may be clamped as the molten resin is fed. In addition, the clamping operation can be temporarily stopped so as to complete clamping at the same time as the completion of feed of the molten resin, unless the cavity clearance reaches the final product thickness before completing feeding of the molten resin. The clamping in the fourth step includes all such embodiments. When clamping is completed, the mold is cooled according to ordinary methods and the mold is opened to remove the multilayer molding partially laminated with the skin material.

In the thus obtained multilayer molding, a part of the skin material fringing end which was inserted into the dent (5) is exposed out of the rear surface of the resin substrate as shown in FIG. 7. At the part of the multilayer molding which is located between two dents (5), the resin substrate on which the skin material is laminated and that on which the skin material is not laminated are connected under the skin material fringe. A part of the skin material fringe is held between the resin of both sides of the skin material fringe and the boundary between the skin material laminated part and the skin material unlaminated part becomes clear.

When the mold having a small groove (10) on the mold surface is used, a part of the skin material fringing end which was inserted into the dent (5) is exposed out of the rear surface of the resin substrate. The rest of skin material fringing end is fixed in a protrusion which is formed on the rear side of the multilayer molding corresponding to the small groove (10) as shown in FIG. 8, and a boundary between the skin material laminated part and the skin material unlaminated part becomes clearer. When a mold further having a continuous protrusion (12) opposing to the small groove (10) on the mold surface is opposed to the mold surface provided with the small groove (10), a groove (13) is formed on the multilayer molding by the continuous protrusion (12). The groove (13) makes the boundary between the skin material laminated part and the skin material unlaminated part clearer. When the dent (5) is provided on the mold surface along the whole fringe of the skin material, the skin material fringing end passes through the resin substrate to its rear surface continuously along the fringe. In addition, the resin substrate located on both sides of the skin material fringing end are firmly bonded (fused) to the skin material fringing end. In this case, a multilayer molding having a remarkably clear boundary between the skin material laminated part and the skin material unlaminated part is obtained.

In the method of the present invention, partial laminating of the skin material means not only the case in which the skin material is partially laminated on only one part of the substrate surface but also the case in which plural skin materials are independently laminated on plural parts of the substrate surface. In the latter case, skin materials laminated on each part may be the same type or different types. Such multilayer molding can be manufactured in the same manner as in the previous cases.

Figure 17:
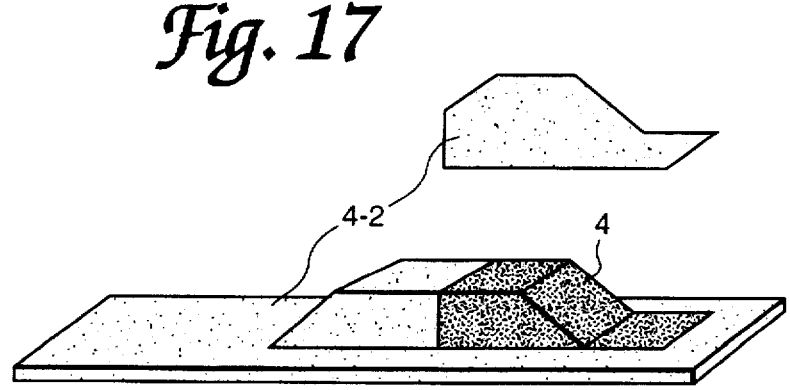
FIG. 17 shows a state in which a part of the second skin material which overlaps the first skin material is cut off after removing the multilayer molding from the mold.

Using the mold of the present invention, a multilayer molding with the first skin material (4-1) partially laminated on the substrate surface and the second skin material (4-2) laminated on the remaining substrate surface as shown in FIG. 17 can be easily manufactured according to the methods as described above. Moreover, a detailed description of the methods used to make the multilayer molding of the example will be presented.

More specifically, between the second and the third steps in the above-mentioned method, a step for placing the second skin material (4-2) is added, and as the final step, a step for cutting off a part of the second skin material overlapping the first skin material (4-1) is added. The whole process is as follows.

The first and the second steps are the same as those described above except for exchanging the skin material (4) for the first skin material (4-1).

Figure 14:
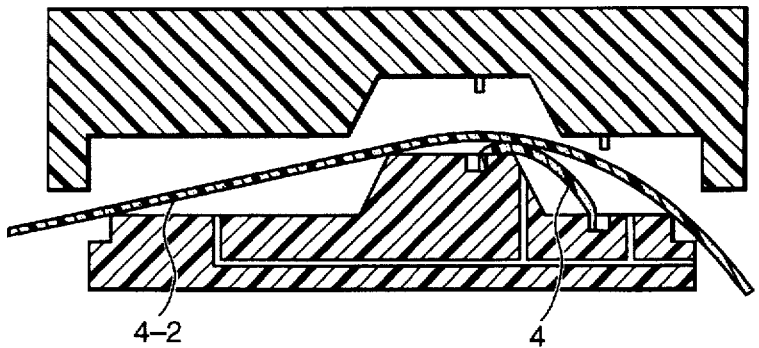
FIG. 14 is a schematic sectional view of the mold during the manufacturing process according to the present invention.

After completion of the second step, the second skin material (4-2) is placed over the whole mold surface while allowing the second skin material (4-2) to cover the first skin material (4-1) (third step, FIG. 14).

Figure 15:
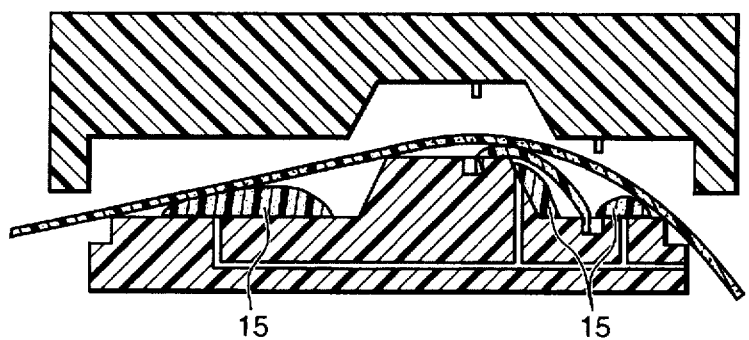
FIG. 15 is a schematic sectional view of the mold during the manufacturing process according to the present invention.
Figure 16:
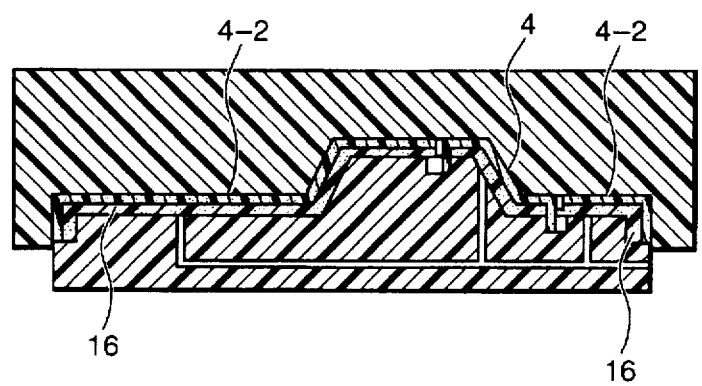
FIG. 16 is a schematic sectional view of the mold during the manufacturing process according to the present invention.

The fourth and the fifth steps are the same as the third and the fourth steps described above except for exchanging the skin material (4) for the first skin material (4-1) (FIGS. 15 and 16).

In the sixth step, a part of the second skin material (4-2) which overlaps the first skin material (4-1) is cut off from the removed molding along the fringe of the first skin material (4-1) as shown in FIG. 17.

In the present invention, the first skin material may be the same as or may be different from the second skin material, but usually, the second skin material is different from the first skin material.

In order to hold the second skin material (4-2) placed on the mold surface in the third step, for example, the end of the second skin material may be held with a clamp provided at the periphery of the mold or it may be held by the parting surface of the male and female molded pieces at the time of clamping.

The method for feeding the molten resin in the fourth step is exactly the same as that described before. The molten resin must be fed from at least the molten resin feeding path opening inside the area of the mold surface where the first skin material is placed. When the molten resin is fed only from the molten resin feeding path opening outside the area where the first skin material is placed, the desired multilayer molding is not obtained.

After completion of the fifth step, the second skin material (4-2) is seemingly laminated on the whole surface of resin substrate. At this time, however, the molding stands in a state in which the second skin material is not laminated on the first skin material (4-1) but is laminated only on the substrate surface.

The sixth step is the step for cutting off a part of the second skin material (4-2) overlapping the first skin material (4-1) along the fringe of the first skin material. When a mold is used in which the small groove (10) is provided on the mold surface along the fringe of the first skin material and the continuous protrusion (12) is provided on the opposing mold surface corresponding to the small groove (10), a groove (13) is formed on the molding along the fringe of the first skin material. In such a case, the second skin material may be successfully cut off along the groove (13).

In the present invention, plural first skin materials may be placed on plural positions of the mold surface in the first step. In this case, a multilayer molding with plural first skin materials laminated can be produced. The first skin materials may be the same or different from each other.

In the manufacturing method of the multilayer molding of the present invention, thermoplastic resins, thermoplastic elastomers and the like which are generally used in a press molding method, an injection molding method, an extrusion molding method and the like are applied as a resin substrate. The exemplary thermoplastic resins includes thermoplastic resins such as polypropylene, polyethylene, acrylonitrilestyrene-butadiene block copolymer, polystyrene, polyvinyl chloride, polycarbonate, acrylic resin, polyacrylate or copolymers thereof, styrene-butadiene block copolymer, polyamide such as nylon, thermoplastic elastomers such as EPM or EPDM, mixtures thereof, or polymer alloys obtainable by using these.

These thermoplastic resins may contain various types of reinforcing fibers such as glass fibers, carbon fibers, organic fibers, and the like generally used, or various organic or inorganic fillers. Various additives such as various type of stabilizers, pigments, lubricants, antistatic agents, foaming agents, foaming aid and the like generally used may also be compounded in the resin.

Examples of a skin material applied to the present method include various types of skin materials known hitherto, such as various types of woven fabric, knitted fabric, non-woven fabric, or sheets or films of a thermoplastic resin or a thermoplastic elastomer, or nets, etc., and they are not particularly limited. The surface of such skin materials may be decorated with uneven patterns such as grain, printing, or dyeing according to an object of using the multilayer molding. These skin materials are used not only independently but also in combinations of two or more skin materials as composite skin materials in which each skin material is laminated with adhesives or thermal fusion. In particular, polyvinyl chloride sheets or thermoplastic elastomer sheets such as an EPDM sheet which are lined with foamed sheets such as a polypropylene foamed sheet are suitably used. These skin materials are frequently used in sheet form, but they may be preheated to improve adhesion between the skin materials and the thermoplastic resin.

According to the method of the present invention using the mold of the present invention, it is possible to manufacture a multilayer molding accurately laminated with the skin material on a specified position and with a clear boundary between a skin material laminated part and a skin material unlaminated part without causing any displacement of the skin material.

EXAMPLES

The following Examples further illustrate the present invention without limiting its scope.

Example 1

Using a mold as shown in FIGS. 1 and 2, a multilayer molding with a skin material partially laminated was manufactured according to the following method. The mold was comprised of a male mold piece (2) which had four dents (5) whose openings were rectangular and measured 20 mm long×40 mm wide×25 mm deep at the positions corresponding to the skin material fringe and a small groove (10) measuring 5 mm wide×7 mm deep at the position corresponding to the whole fringe of the skin material and a female mold piece (1) which had a continuous protrusion (12) measuring 2 mm wide×6 mm high, corresponding to the small groove.

A composite skin material in which a 0.6 mm thick polyvinyl chloride sheet with a grain pattern was lined with a 3 mm thick polypropylene foamed sheet having an expansion ratio of 15 times was used as the skin material (4). The skin material (4) was cut to have insertion allowances (17-1, 17-2 as shown in FIG. 13) that enable the skin material fringing end to be inserted into the dents and the small groove. The cut skin material was placed in the specified position on the male mold surface so that the foamed layer faced the male mold surface and the insertion allowances were inserted into the dents and the small groove. In this case, the insertion allowance (17-2) inserted into the small groove had a length of 5 mm. Those insertion allowances (17-1) inserted into the dents had a width of 20 mm, the same as the length of the openings of the dents, and their insertion length was 25 mm, the same as the depth of the dents.

Blocks (6) 20 mm long, 38.5 mm wide, and 25 mm high corresponding to the space profile of the dents were fitted to the dents, and the insertion allowances were sandwiched in clearances of 1.5 mm between the surfaces of the blocks and the inner walls of the dents to fix the skin material.

The clamping machine was then operated. When the clearance between the male and the female mold pieces became 30 mm, the motion of the mold was stopped and molten polypropylene of 200° C. (Sumitomo Noblen BPZ5077 manufactured by Sumitomo Chemical Co., Ltd.) was fed from the molten resin feeding path opening inside the area of the male mold surface where the skin material (4) was placed as well as from the molten resin feeding path opening outside of the area. In this case, molten polypropylene of 20% in excess of that necessary for the resin substrate was fed from the former feeding path and the rest was fed from the latter molten resin feeding path.

After feeding the molten resin, the clamping machine was again operated to restart clamping. The mold was pressurized and clamped so that the cavity clearance achieved the desired final product thickness of 5 mm. After cooling with the pressure held, the mold was opened and the multilayer molding with the skin material (4) partially laminated was removed.

The obtained multilayer molding had a skin material accurately laminated on the specified position without causing any displacement of the skin material. The obtained multilayer molding also had a groove (13) with the skin material fringing end embedded in resin formed at the boundary between the skin material laminated part and the substrate surface exposed (the skin material unlaminated part). The boundary between the two parts was remarkably clear and the multilayer molding had good appearance.

Comparative Example 1

A multilayer molding was produced according to Example 1, except that a mold containing a male mold piece with only the small groove (10) but without dents was used and only the insertion allowance (17-2) was inserted into the small groove.

A multilayer molding was obtained in which the skin material was displaced, the middle part of the skin material was pressed into a groove (13) formed, or parts consisting only of resin existing at the part where the skin material should be laminated and the skin material fringing end partially jumping out onto the surface of the substrate.

This manufacturing example was repeated but the position where the skin material was laminated differed each time and the desired multilayer moldings were not stably obtained.

Example 2

Using the same mold as in Example 1, except that the width of the small groove (10) provided on the male mold surface was 6 mm and the width of the block (6) was 37.5 mm, a multilayer molding in which the whole surface of the substrate was covered with skin materials was produced.

A composite skin material in which a 2 mm thick polyester fabric was lined with a 3 mm thick polypropylene foamed sheet having an expansion ratio of 15 times was used as the first skin material (4-1). The first skin material (4-1) was cut to have insertion allowances (17-1, 17-2 as shown in FIG. 13) that enabled the skin material fringing end to be inserted into the dents (5) and the small groove (10). The cut first skin material was placed in the specified position on the male mold surface so that the foamed layer faced the male mold surface and the insertion allowances were inserted into the dents and the small groove. In this case, the insertion allowance (17-2) inserted into the small groove had a length of 5 mm. Those insertion allowances (17-1) inserted into the dents had a width of 20 mm, the same as the length of the openings of the dents, and their insertion length was 25 mm, the same as the depth of the dents.

Blocks (6) were fitted to the dents and the insertion allowances were sandwiched in clearances of 2.5 mm between the surfaces of the blocks and the inner walls of the dents to fix the skin material.

Thereafter, the second skin material (4-2) (a composite skin material in which a 0.6 mm thick polyvinyl chloride sheet with a grain pattern was lined with a 3 mm thick polypropylene foamed sheet having an expansion ratio of 15 times) was placed with the foamed layer facing the male mold surface so that it covers the whole area of the mold surface while covering the first skin material (4-1).

In the same manner as in Example 1, molten polypropylene, which was the same as that used in Example 1, was fed, clamped, and cooled. A molding completely covered with the second skin material (4-2) was obtained.

The part of the second skin material (4-2) which overlapped the surface of the first skin material (4-1) was then cut off with a cutter along the groove (13) formed along the fringe of the first skin material (4-1).

A multilayer molding in which the substrate surface was completely laminated with the first skin material (4-1) and the second skin material (4-2) and at the same time the first skin material (4-1) was accurately laminated on the specified position without causing any displacement was obtained. In the obtained multilayer molding, the fringe of the first skin material (4-1) was successfully accommodated inside the groove (13), the first skin material (4-1) and the second skin material (4-2) were clearly separated by said groove, and the appearance was good.

Comparative Example 2

A multilayer molding with the first skin material (4-1) and the second skin material (4-2) laminated on the substrate surface was produced according to Example 2, except that a male mold piece (2) with only the small groove (10) but without dents was used and only the insertion allowance (17-2) of the first skin material (4-1) was inserted into the small groove.

A multilayer molding was obtained in which the first skin material was excessively displaced and protruded out of the area surrounded by the formed groove (13) or the second skin material (4-2) was also laminated inside the area surrounded by the groove (13).

This manufacturing example was repeated, but the position where the first skin material (4-1) was laminated and the condition of the laminated first skin material (4-1) differed each time. The desired multilayer moldings were not able to be stably obtained.

Example 3

A multilayer molding with the skin material (4) partially laminated was produced according to Example 1, except that blocks in which two 3 mm-long pins were provided on their bottom surfaces and whose height including the pins were the same as the depth of the dents (5) provided on the mold surface were used. The length of the insertion allowances (17-1) of the skin material to be inserted into the dents were 40 mm each and the skin material fringing ends were pierced to be fixed by the pins provided on the bottom surface of the blocks.

The obtained multilayer molding was completely free from displacement of the skin material, and the boundary between the skin material laminated part and the skin material unlaminated part was remarkably clear. In addition, the appearance of the obtained multilayer molding was as satisfactory as that obtained in Example 1.

Example 4

A multilayer molding partially laminated with a skin material (4) was produced according to Example 1, except that a mold apparatus was used in which blocks (6) were linked with the male mold piece (2) via sliding shafts (9) provided in the mold piece and passing through the bottom walls of the dents and able to slide in the mold-opening/closing direction. In the mold apparatus, each sliding shaft was controlled so that each block could be moved simultaneously with each other.

In this Example, the operation to fit the blocks one by one into the dents was omitted. The multilayer molding obtained was completely free from any displacement of the skin material and its appearance was as satisfactory as that of the molding obtained in Example 1.

While the invention has been described in connection with what is presently considered to be the most practical and preferred embodiments, it is to be understood that the invention is not limited to the disclosed embodiments, but on the contrary is intended to cover various modifications and equivalent arrangements included within the spirit and scope of the appended claims.

Thus, it is to be understood that variations in the present invention can be made without departing from the novel aspects of this invention as defined in the claims.

The entire disclosure of all patents and patent applications cited herein are hereby incorporated by reference and relied upon.

What is claimed is:

1. A method for manufacturing a multilayer molding partially laminated with a skin material on a surface of a substrate comprising the combination of the following steps:

a) providing a cut skin material with at least one fringing end;

b) providing a mold comprising:

i) a male mold piece and a female mold piece wherein said mold pieces have respectively opposing mold surfaces and at least one of said male mold piece or said female mold piece has at least one molten resin feeding path opening to at least a section of its mold surface on which section said cut skin material is to be placed and at least one dent in that mold surface, and ii) at least one block which is capable of being fitted into the at least one dent;

c) placing said cut skin material on a section of the mold surface having at least one molten resin feeding path opening so that at least one said molten resin feeding path opening is covered with said cut skin material;

d) inserting at least a part of at least one said fringing end of said cut skin material into the at least one dent;

e) fitting said at least one block into said at least one dent so that said at least a part of said fringing end of said cut skin material which was inserted into said a least one dent is sandwiched between said at least one block and said at least one dent;

f) feeding a molten thermoplastic resin through the at least one said molten resin feeding path opening which is covered by said cut skin material;

g) closing said mold pieces until a specified cavity clearance between said opposing mold surfaces is achieved so that said molten thermoplastic resin is molded and laminated with said cut skin material;

h) cooling said mold whereby said multilayer molding is obtained; and i) removing the thus formed multilayer molding from said mold.

2. The method for manufacturing a multilayer molding according to claim 1, wherein the skin material cut with an insertion allowance to be inserted into the at least one dent is used.

3. The method for manufacturing a multilayer molding according to claim 1, wherein the method further comprises after step e) the step of:

feeding molten thermoplastic resin through at least one molten resin feeding path opening which is not covered by said cut skin material, in said method before completing said step g).

4. The method of manufacturing a multilayer molding according to claim 1, wherein one of said mold pieces, which has said at least one molten resin feeding path, also has a groove on its mold surface and the other mold piece has a corresponding protrusion on its mold surface opposing said groove.

5. A method for manufacturing a multilayer molding with a first skin material laminated on a part of a surface of a substrate and a second skin material laminated on a remaining surface of said substrate comprising the combination of the following steps:

a) providing a cut first skin material with at least one fringing end;

b) providing a mold comprising:
  i) a male mold piece and a female mold piece wherein said mold pieces have respectively opposing mold surfaces and at least one of said male mold piece or said female mold piece has at least one molten resin feeding path opening to at least a section of its mold surface on which section said cut first skin material is to be placed and at least one dent in that mold surface, and
  ii) at least one block which is capable of being fitted into at least one dent;

c) placing said cut first skin material on a section of the mold surface having at least one molten resin feeding path opening so that at least one said molten resin feeding path opening is covered with said cut first skin material;

d) inserting at least a part of one said fringing end of said cut first skin material into the at least one dent;

e) fitting said at least one block into said at least one dent so that at least a part of the fringing end of said cut first skin material which was inserted into said at least one dent is sandwiched between said at least one block and said at least one dent;

f) placing said second skin material over the mold surface having at least one molten resin feeding path opening over which said cut first skin material was not placed while allowing said second skin material to cover said art first skin material;

g) feeding a molten thermoplastic resin through the at least said molten resin feeding path opening which is covered by said cut first skin material;

h) closing said mold pieces until a specified cavity clearance between said opposing mold surfaces is achieved so that said molten thermoplastic resin is laminated with said cut first skin material and said second skin material at a section where said second skin material does not overlap said cut first skin material;

i) cooling said mold whereby said multilayer molding is obtained; and j) removing the thus formed multilayer molding from said mold.

6. The method for manufacturing a multilayer molding according to the claim 5, wherein the first skin material cut with an insertion allowance to be inserted into the at least one dent is used.

7. The method for manufacturing a multilayer molding according to claim 5, the method further comprises the step:

k) cutting off a part of said second skin material which overlaps said cut first skin material from said removed multilayer molding along a fringe of said cut first skin material.

8. The method for manufacturing a multilayer molding according to claim 5, wherein the method further comprises, after step f), the step of:

feeding said molten thermoplastic resin through at least one molten resin feeding path opening which is not covered by said cut first skin material, in said method before completing said step h).

9. The method for manufacturing a multilayer molding according to claim 5, wherein the at least one of said mold pieces which has said at least one molten resin feeding path also has a groove on its mold surface and the other mold piece has a corresponding protrusion on its mold surface opposing said groove.

* * * * *